United States Patent
Oh (10) Patent No.: US 8,027,412 B2
(45) Date of Patent: Sep. 27, 2011

(54) APPARATUS AND METHOD FOR DETECTING FRAME BOUNDARY IN WIRELESS COMMUNICATION SYSTEM

(75) Inventor: Ji-myung Oh, Goyang-si (KR)

(73) Assignee: Seah Networks Co., Ltd., Seoul (KR)

( * ) Notice: Subject to any disclaimer, the term of this patent is extended or adjusted under 35 U.S.C. 154(b) by 746 days.

(21) Appl. No.: 12/158,305

(22) PCT Filed: Dec. 28, 2006

(86) PCT No.: PCT/KR2006/005794
§ 371 (c)(1),
(2), (4) Date: Jun. 19, 2008

(87) PCT Pub. No.: WO2007/078094
PCT Pub. Date: Jul. 12, 2007

(65) Prior Publication Data
US 2008/0304604 A1    Dec. 11, 2008

(30) Foreign Application Priority Data
Dec. 30, 2005    (KR) .................. 10-2005-0135959

(51) Int. Cl.
*H04L 27/06* (2006.01)
(52) U.S. Cl. ........................... 375/340; 375/343
(58) Field of Classification Search .......... 375/316, 375/324, 340, 343
See application file for complete search history.

(56) References Cited

U.S. PATENT DOCUMENTS

| | | | |
|---|---|---|---|
| 7,359,314 B2 * | 4/2008 | Sakata et al. | 370/210 |
| 2002/0154714 A1 * | 10/2002 | Aihara et al. | 375/347 |
| 2003/0099314 A1 * | 5/2003 | Gummadi et al. | 375/343 |

FOREIGN PATENT DOCUMENTS

| | | |
|---|---|---|
| JP | 09064857 | 3/1997 |
| JP | 2004222023 | 8/2004 |
| KR | 1020030055643 A | 7/2003 |
| KR | 1020050063018 A | 6/2005 |

OTHER PUBLICATIONS

Korean Intellectual Property Office. International Search Report for International Application No. PCT/KR2006/005794, 3 pages (Date completed: Apr. 25, 2007).

* cited by examiner

*Primary Examiner* — Emmanuel Bayard

(57) ABSTRACT

Disclosed is an apparatus and a method for detecting a boundary of a frame in a wireless communication system. The apparatus includes: a controller for measuring correlation energy with preambles with respect to received signals transmitted from a transmitter, measuring strength of the received signals, and removing a sample from frames constituting the received signals, the preambles predetermined and used by the system, the sample having a ratio of the correlation energy with respect to the strength of the received signals, the ratio being smaller than a reference value; and a classifier for extracting a maximum value from the correlation energy received from the controller, and determining a boundary of a downlink of the frames constituting the received signals.

21 Claims, 11 Drawing Sheets

APPARATUS AND METHOD FOR DETECTING FRAME BOUNDARY IN WIRELESS COMMUNICATION SYSTEM

CROSS REFERENCE TO RELATED APPLICATIONS

This application is a US National Stage of International Patent Application No. PCT/KR2006/005794, filed Dec. 28, 2006, which in turn claims the benefit of Korean Patent Application No. 10-2005-0135959, filed Dec. 30, 2005, the disclosures of both applications are incorporated herein by reference.

TECHNICAL FIELD

The present invention relates to an apparatus and a method for detecting the boundary of a downlink frame in a wireless communication system, and more particularly to an apparatus and a method for detecting the boundary of a downlink frame in a wireless communication system using Time Division Duplexing (hereinafter, referred to as TDD).

BACKGROUND ART

A TDD denotes technology for time-dividing a signal frame of the same frequency band according to an uplink and a downlink, and supporting bidirectional transmission.

As compared to Frequency Division Duplexing (hereinafter, referred to as FDD) in which different frequency bands are used for uplink and downlink signals, a TDD is suitable for the transmission of an asymmetric or burst application by dynamically allocating time slots, can support the same transmission speed by using few time slots, and can provide a service by using ½ frequency as compared to the FDD.

Such a TDD has been recognized as attractive technology to a communication provider intended for proving of a portable Internet service at low cost, and has attracted public attention as important technology for proving a portable Internet service. However, a TDD is disadvantageous in that the timing and synchronization processes of an application according to the dynamic allocation of a time slot are very difficult.

Accordingly, in a wireless communication system using a TDD, a synchronization process is necessary. For the synchronization process, a preamble must be detected. In order to detect the preamble, it is necessary to detect the boundary of a downlink frame including the preamble.

DISCLOSURE OF INVENTION

Technical Problem

Therefore, the present invention has been made in view of the above-mentioned problems, and it is an object of the present invention to provide an apparatus and a method for detecting the boundary of a downlink frame by using preamble correlation energy and reception signal strength in a wireless communication system using a TDD.

It is another object of the present invention to provide an apparatus and a method for detecting the boundary of a downlink frame by using preamble correlation energy and reception signal strength, except for hypothesis verification for an uplink frame in received signals, in a wireless communication system using a TDD.

It is further another object of the present invention to provide an apparatus and a method for detecting the boundary of a downlink frame by controlling an amplifier gain of a Radio Frequency (RF)/Intermediate Frequency (IF) module, and by using preamble correlation energy and reception signal strength in a wireless communication system using a TDD.

It is still another object of the present invention to provide an apparatus and a method for detecting the boundary of a downlink frame by using preamble correlation energy and reception signal strength and controlling an amplifier gain of an RF/IF module, except for hypothesis verification for an uplink frame in received signals, in a wireless communication system using a TDD.

Technical Solution

In order to accomplish these objects, there is provided an apparatus for detecting a boundary of a frame in a wireless communication system, the apparatus including: a controller for measuring correlation energy with preambles with respect to received signals transmitted from a transmitter, measuring strength of the received signals, and removing a sample from frames constituting the received signals, the preambles predetermined and used by the system, the sample having a ratio of the correlation energy with respect to the strength of the received signals, the ratio being smaller than a reference value; and a classifier for extracting a maximum value from the correlation energy received from the controller, and determining a boundary of a downlink of the frames constituting the received signals.

In order to accomplish these objects, there is provided an apparatus for detecting a boundary of a frame in a wireless communication system, the apparatus comprising: a preamble correlation energy detector for detecting correlation energy of one or more samples of decimator output signals and at least one predetermined preamble; a received signal strength detector for measuring the strength of the decimator output signals in each of the samples; an energy comparator/controller for comparing the correlation energy received from the preamble correlation energy detector with the strength of the received signals received from the received signal strength detector, and removing a sample in which the ratio of the correlation energy with respect to the strength of the received signals is smaller than a reference value; and a classifier for extracting a maximum value from the correlation energy received from the energy comparator/controller, and determining a boundary of a downlink of frames constituting the received signals.

In order to accomplish these objects, there is provided a method for detecting a boundary of a frame in a wireless communication system, the method comprising the steps of: a) measuring correlation energy of sample signals transmitted from a transmitter and preambles predetermined and used by the system, and measuring strength of the sample signals transmitted from the transmitter; b) removing a sample in which a ratio of the correlation energy with respect to the strength of the received signals is smaller than a reference value; and c) extracting a maximum value from the correlation energy in which the sample has been removed, and determining a boundary of a downlink of frames constituting the received signals.

ADVANTAGEOUS EFFECTS

According to the present invention, in a wireless communication system using a TDD, it is possible to effectively remove the influence of interference signals existing in an uplink frame when detecting the boundary of a downlink frame.

Accordingly, it is possible to considerably reduce a probability of failing to detect the boundary of the downlink frame, which may occur in a place having poor channel environments such as a cell boundary.

Further, since the reduction of the failure probability has direct influence on frame boundary detection time, it is possible to effectively detect the boundary of the downlink frame through the present invention in a short time even in a place in which it is difficult to detect the boundary of the downlink frame due to poor channel environments.

BRIEF DESCRIPTION OF THE DRAWINGS

Hereinafter, an exemplary embodiment of the present invention will be described in detail with reference to the accompanying drawings. Well known functions and constructions are not described in detail since they would obscure the invention in unnecessary detail.

The foregoing and other objects, features and advantages of the present invention will become more apparent from the following detailed description when taken in conjunction with the accompanying drawings in which.

MODE FOR THE INVENTION

Hereinafter, an exemplary embodiment of the present invention will be described in detail with reference to the accompanying drawings. Well known functions and constructions are not described in detail since they would obscure the invention in unnecessary detail.

Generally, a wireless communication system using pilot signals including a preamble, etc., employs a hypothesis verification method in order to detect a frame boundary. The hypothesis verification method measures the correlation energy of pilot signals for all cases in which a frame boundary can exist, and determines the time point corresponding to a case having the maximum correlation energy as a frame boundary.

In order to detect a frame boundary, the hypothesis verification method is applied to a preamble located in the initial symbol of a frame, so that the position of the preamble is found. The position of the preamble found in this way corresponds to a frame boundary. Hereinafter, a method for finding a frame boundary by detecting the position of a preamble will be described.

Figure 1:
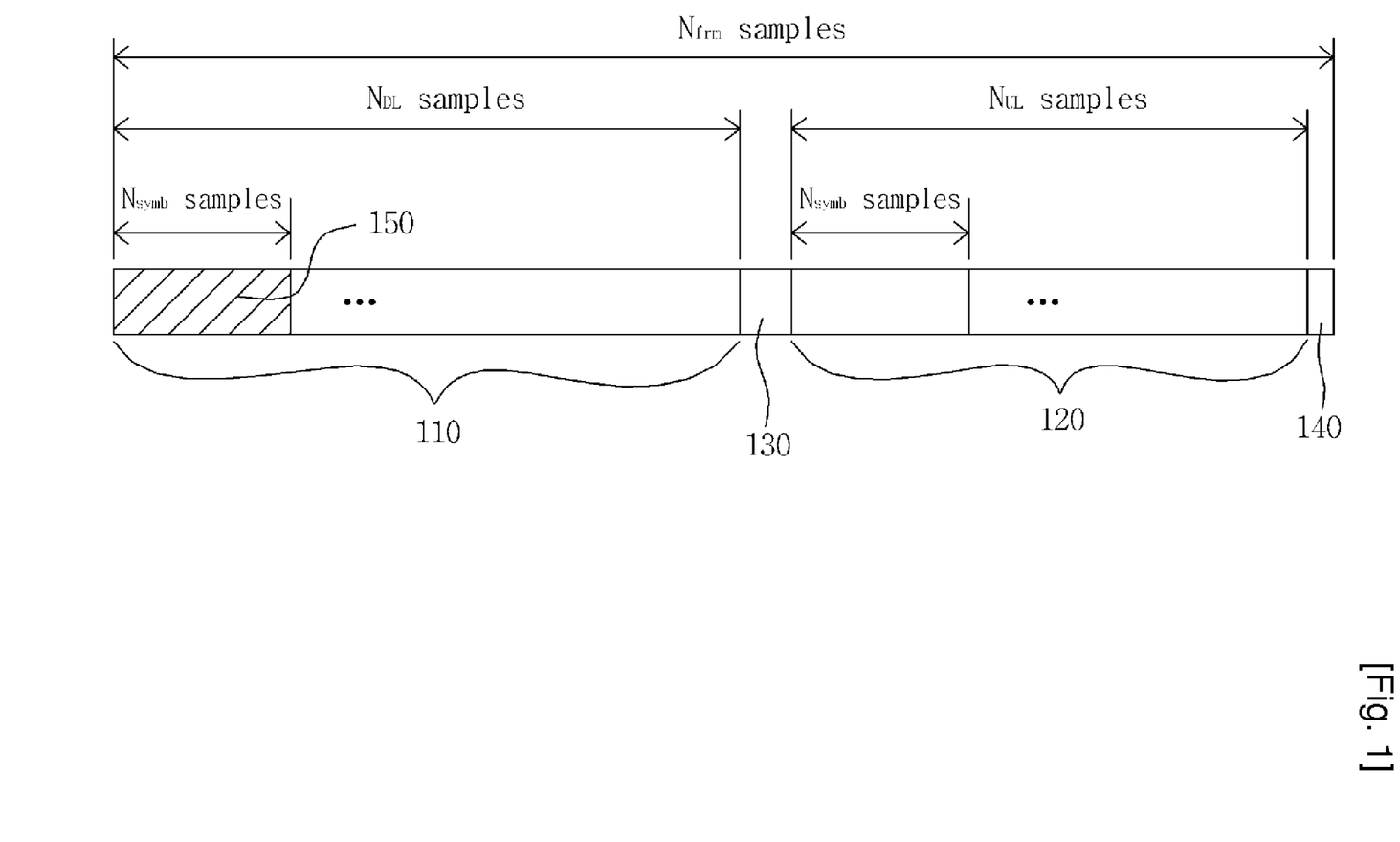
FIG. 1 is a diagram showing the structure of a frame used in a wireless communication system using a TDD.

FIG. 1 is a diagram showing the structure of a frame used in a wireless communication system using a TDD. According to a TDD as described above, one frame is divided into a transmission frame and a reception frame, i.e. a downlink frame 110 and an uplink frame 120, as shown in FIG. 1, and bidirectional communication is performed using the same frequency. The frame includes $N_{frm}$ samples. The downlink frame 110 includes $N_{DL}$ samples and the uplink frame 120 includes $N_{UL}$ samples. Further, a Transmit/receive Transition Gap (TTG) 130 exists between the downlink frame 110 and the uplink frame 120, and a Receive/transmit Transition Gap (RTG) 140 exists between the uplink frame 120 and the downlink frame 110. Each of the downlink frame 110 and the uplink frame 120 includes a plurality of symbols comprised of $N_{symb}$ samples, and the first symbol 150 of a downlink includes a preamble.

Figure 2:
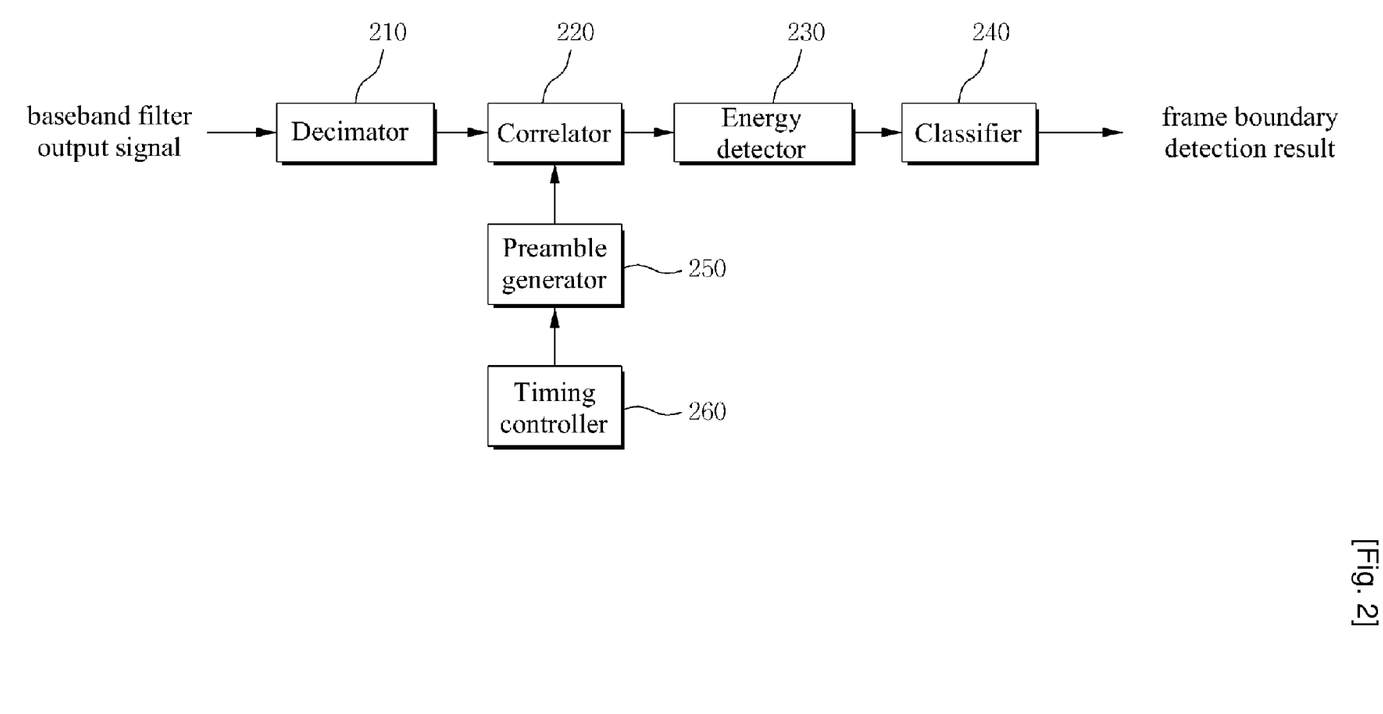
FIG. 2 is a block diagram showing the construction of an apparatus for detecting a frame boundary by using a hypothesis verification method in a wireless communication system using the frame structure as shown in FIG. 1.

FIG. 2 is a block diagram showing the construction of an apparatus for detecting a frame boundary by using a hypothesis verification method in a wireless communication system using the frame structure as shown in FIG. 1.

The frame boundary detection apparatus in FIG. 2 includes a decimator 210, a correlator 220, an energy detector 230, a classifier 240, a preamble generator 250 and a timing controller 260.

The decimator 210 samples and outputs the output signals of a baseband filter, which are over-sampled in the prior stage and then received. The preamble generator 250 generates preambles predetermined and used by a system, and provides the generated preambles to the correlator 220.

The correlator 220 calculates correlation values between the sample output signals inputted through the decimator 210 and the preambles provided by the preamble generator 250. In more detail, the correlator 220 calculates the correlation values for the sample signals inputted from the decimator 210 by using all preambles used in the system. That is, correlation values for all preambles provided by the preamble generator 250 are respectively outputted for one sample signal inputted from the decimator 210.

The timing controller 260 adjusts the phases of the preambles generated by the preamble generator 250, and provides the preambles to the correlator 220, and the correlator 220 calculates correlation values for all preambles provided by the preamble generator 250. The energy detector 230 measures correlation energy values from all correlation values outputted from the correlator 220, and outputs the measured correlation energy values. The classifier 240 extracts the maximum value of the correlation energy values outputted from the energy detector 230, regards that a preamble is located in a corresponding position, determines the position of the preamble as a frame boundary, and outputs results from the determination.

When considering the frame structure as shown in FIG. 1, in a case in which the first symbol of a downlink frame inputted to the correlator 220 is precisely synchronized with the preamble generated by the preamble generator 250, the correlation energy value indicates a maximum value. In other cases, relatively low correlation energy is shown according to the random signal characteristics of the preamble. Further, in order to detect a frame boundary according to the hypothesis verification method used in FIG. 2, a receiver including the frame boundary detection apparatus of FIG. 2 must measure all of the $N_{frm}$ correlation energy values corresponding to the number of samples constituting the frame.

Herein, a case in which a maximum correlation energy value is measured in the uplink frame may occur. Such a case may occur when, in terms of the receiver of a specific Portable Subscriber Station (hereinafter, referred to as PSS), the strength of signals transmitted from a Radio Access Station (hereinafter, referred to as RAS) is much smaller than that of signals transmitted from other PSSs adjacent to the specific PSS. This corresponds to a case in which large path loss occurs between the specific PSS and the RAS, and said other PSSs are located in an adjacent position. The signals transmitted from said other PSSs must be removed from the receiver of the specific PSS because they are transmitted from the uplink frame. However, in the wireless communication system using the TDD, since the receiver of the PSS cannot distinguish the uplink frame from the downlink frame before finding a frame boundary, signals existing in the uplink frame may be received.

Figure 3:
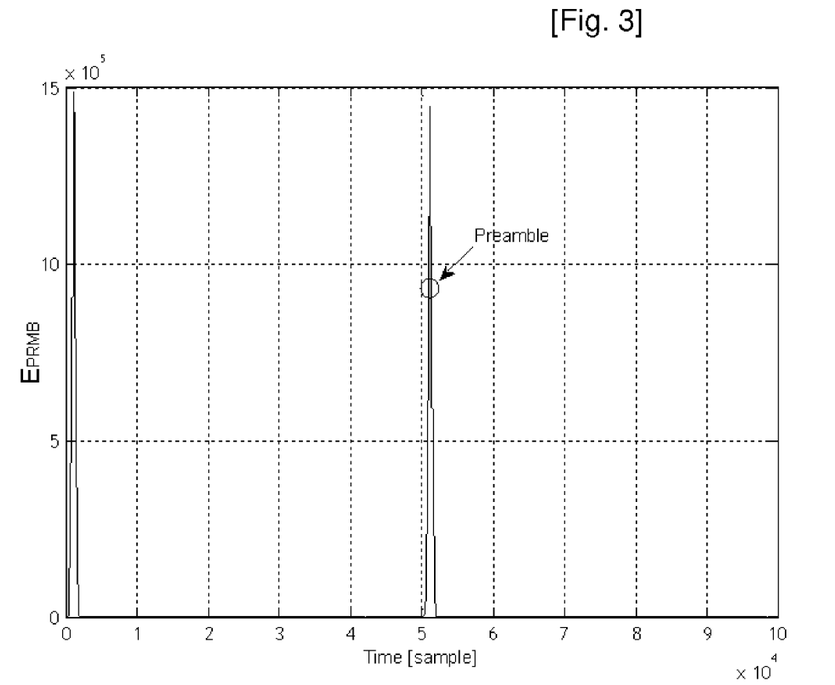
FIGS. 3 to 5 are simulation graphs of preamble correlation energy and received signal strength for describing the present invention.
Figure 4:
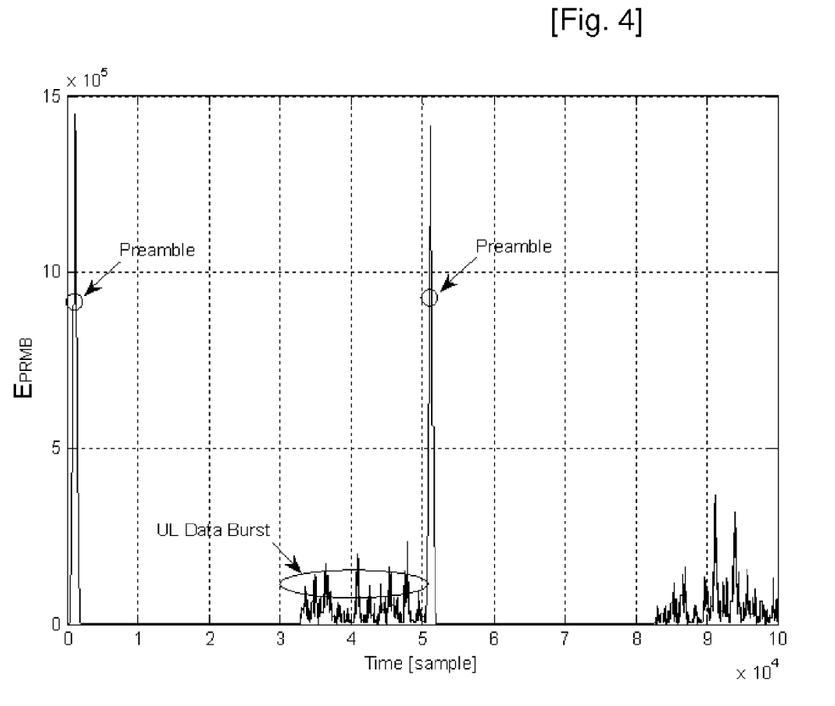

Hereinafter, a case in which interference signals exist in the uplink frame will be described with reference to the accompanying graphs. When interference signals do not exist in the uplink frame as shown in FIG. 3, it can be understood that preamble correlation energy $E_{PRMB}$ is measured only in a preamble on a time axis in the unit of sample. FIG. 4 shows preamble correlation energy $E_{PRMB}$ when uplink interference signals exist, which have power greater than that of downlink signals by +10 dB. In FIG. 4, it can be understood that uplink data burst exists in the uplink frame together with the preamble. However, in such a case, since the preamble correlation energy is greater than that of the uplink data burst, the uplink data burst does not have influence on detecting the boundary of the downlink frame by detecting the preamble.

Figure 5:
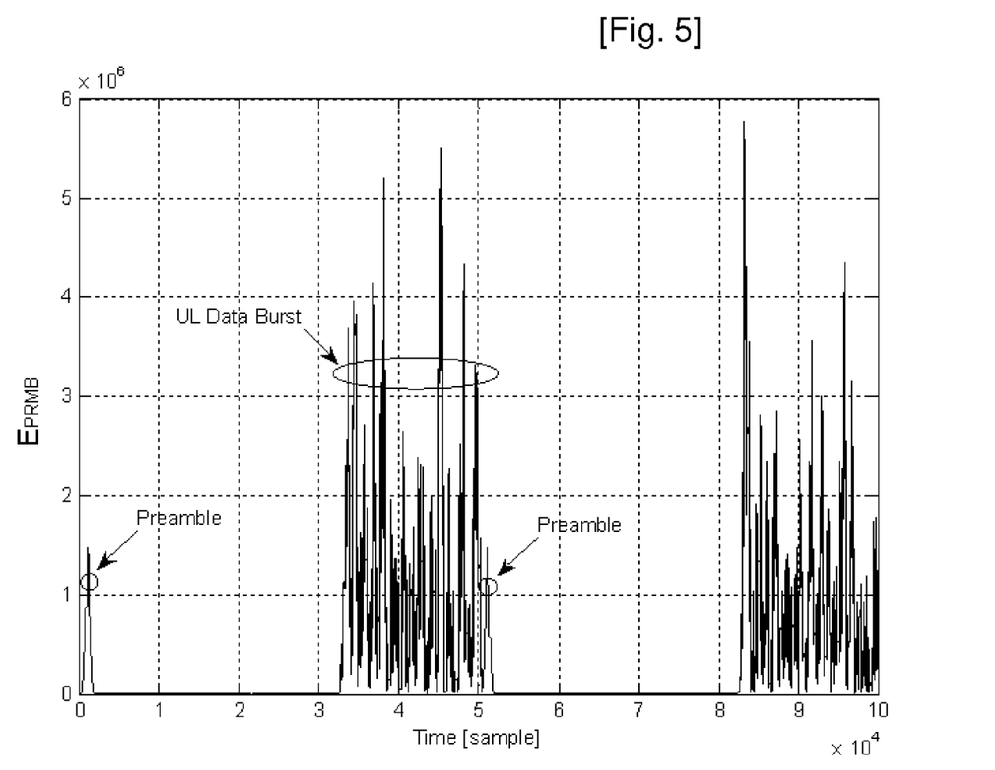

As shown in FIG. 5, when the uplink interference signals exist, which have power greater than that of the downlink signals by +20 dB, it is difficult to actually detect the preamble because the energy of the uplink data burst is greater than that of the preamble as shown in a case of measuring the preamble correlation energy $E_{PRMB}$.

Such a problem may frequently occur in a case in which a plurality of PSSs are crowded. In such a case, since neighbor PSSs adjacent to the specific PSS having previously accessed a RAS do not detect a frame boundary, it may become impossible for the neighbor PSSs to access the RAS.

Accordingly, the present invention is characterized in that the uplink frame is removed when detecting the boundary of a downlink frame, and then the boundary of the downlink frame is detected.

Hereinafter, the preferred embodiment of the present invention will be described in detail with reference to the accompanying drawings.

Figure 6:
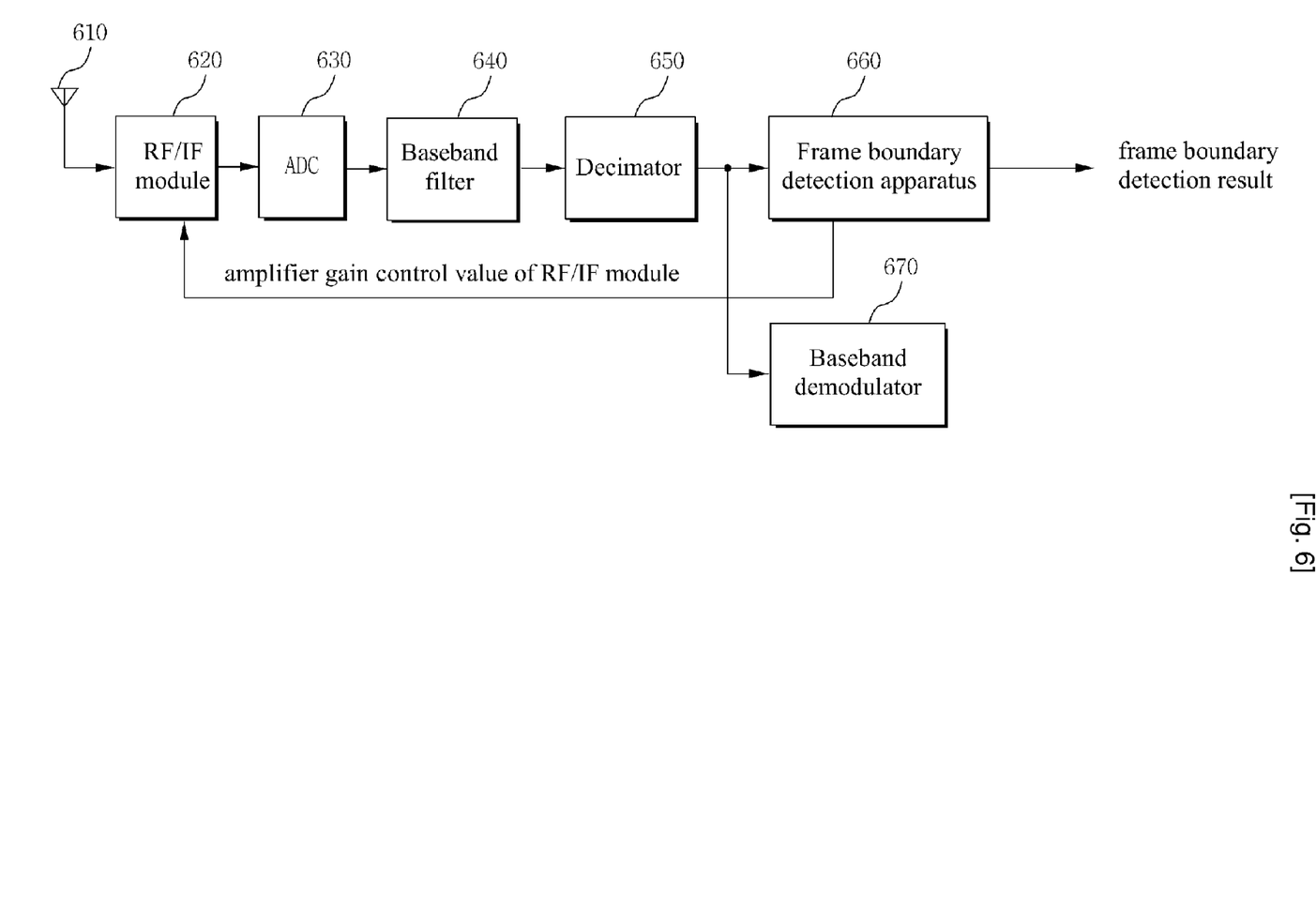
FIG. 6 is a block diagram showing the construction of a receiver in a wireless communication system using a TDD.

First, the present invention is applied to a receiver in the wireless communication system using the TDD. The receiver has a structure as shown in FIG. 6. In more detail, the receiver includes an antenna 610, an RF/IF module 620, an Analog to Digital Converter (hereinafter, referred to as ADC) 630, a baseband filter 640, a decimator 650, a frame boundary detection apparatus 660, and a baseband demodulator 670.

The antenna 610 receives signals from a transmitter through a radio channel, and outputs the received signals to the RF/IF module 620. The RF/IF module 620 performs demodulation, amplification, filtering, etc., for the signals received from the antenna 610 in RF and IF bands, and outputs analog signals obtained by processing the signals to the ADC 630. The ADC 630 converts the analog signals received from the RF/IF module 620 into digital signals. That is, the signals from the signals received through the antenna 610 to the signals outputted from the RF/IF module 620 correspond to analog signals. The baseband filter 640 filters signals, which have changed into the baseband signals through the RF/IF module 620, to be suitable for use by the baseband demodulator 670. Herein, the baseband filter 640 uses the digital signals converted by the ADC 630. The decimator 650 samples over-sampled signals again, and uses the signals outputted from the baseband filter 640. The frame boundary detection apparatus 660 detects the frame boundary of received signals, and obtains time synchronization. For this, the frame boundary detection apparatus 660 uses the output signals of the decimator 650. The baseband demodulator 670 receives the output signals of the decimator 650, and demodulates signals having changed into the baseband signals.

Figure 7:
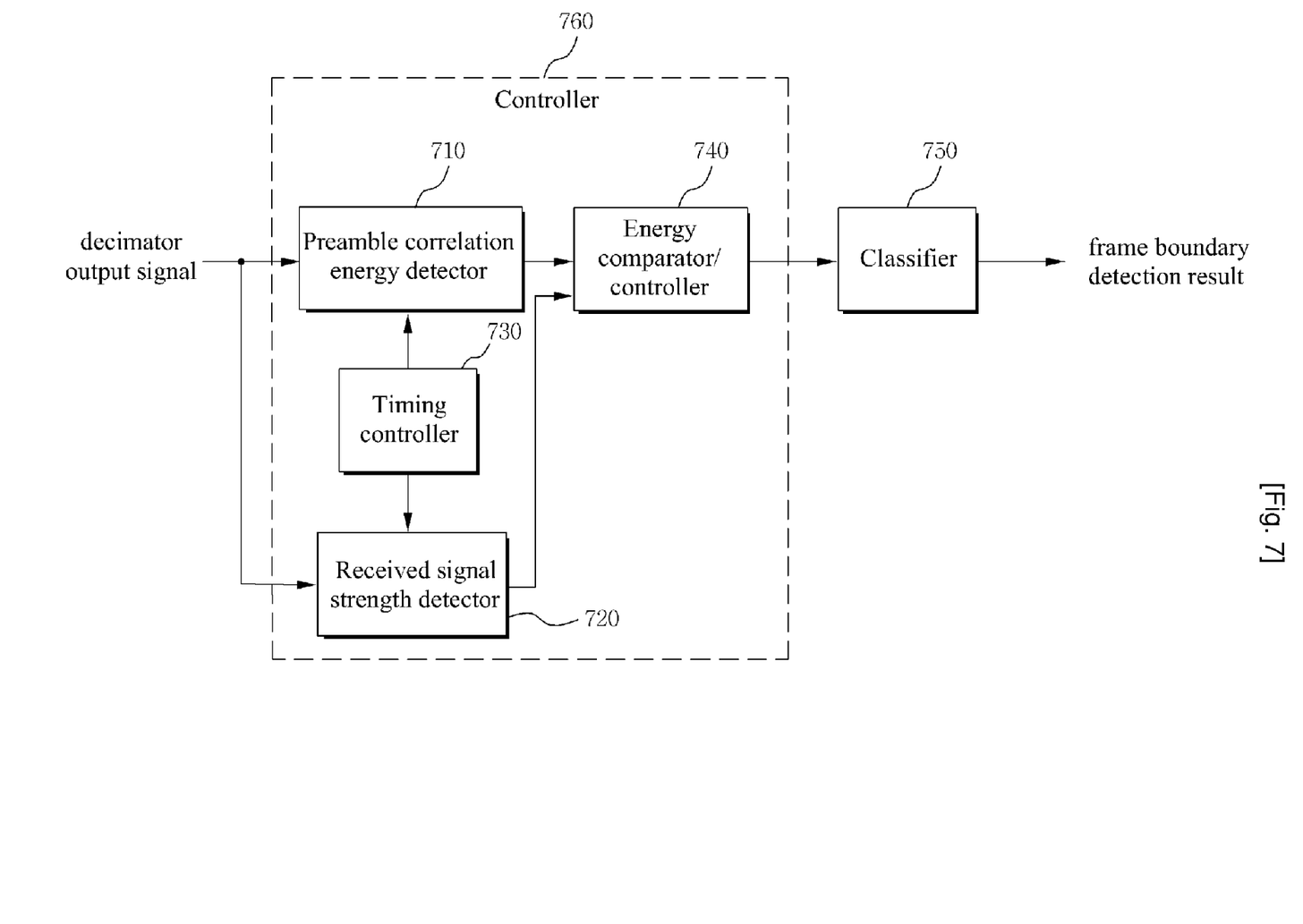
FIG. 7 is a block diagram showing the detailed construction of an apparatus detecting the boundary of a downlink frame in a wireless communication system using a TDD according to a first embodiment of the present invention.

Herein, the present invention relates to the frame boundary detection apparatus 660. FIG. 7 shows the detailed construction of the apparatus detecting the boundary of the downlink frame in the wireless communication system using the TDD according to the first embodiment of the present invention.

As shown in FIG. 7, the boundary detection apparatus according to the first embodiment of the present invention includes a preamble correlation energy detector 710, a received signal strength detector 720, a timing controller 730, an energy comparator/controller 740, and a classifier 750. The construction may be largely divided into a controller 760 and the classifier 750, wherein the controller 760 includes the preamble correlation energy detector 710, the received signal strength detector 720, the timing controller 730, and the energy comparator/controller 740. The controller 760 measures the correlation energy of preambles included in received signals in the unit of sample, measures the strength of the received signals, and removes a sample, in which the ratio of the correlation energy with respect to the strength of the received signals is smaller than a reference value, from frames constituting the received signals. The classifier 750 extracts a maximum value from the correlation energy of the preambles received from the controller 760, and determines a sample corresponding to the maximum value of the correlation energy as the boundary of a downlink.

The preamble correlation energy detector 710 generates the preambles predetermined by a system for use, calculates correlation values with inputted decimator output signals, and then measures correlation energy values from the calculated correlation values. Herein, the timing controller 730 adjusts the phases of the preambles generated by the preamble correlation energy detector 710. Since the signals are received from the decimator in the unit of sample, the preamble correlation energy detector 710 measures the correlation values and correlation energy values for all the generated preambles in each sample. The controller 730 may be included in the preamble correlation energy detector 710.

As described above, the preamble correlation energy detector 710 may directly generate and use the preambles, predetermined by the system for use, through the control of the timing controller 730 if the situation requires. In addition, the preamble correlation energy detector 710 may also store in advance the predetermined preambles in a storage unit such as a ROM, and sequentially read and use the preambles.

Further, when the preamble correlation energy detector 710 measures the correlation values and correlation energy values by using all preambles used in the system, it must measure correlation values and correlation energy values with all the preambles in each sample. Therefore, the amount of calculation thereof significantly increases. On account of this, if the situation requires, the preamble correlation energy detector 710 may also measure the correlation energy values by using only the output signals of the decimator as follows. When using only the output signals of the decimator, the number of hypothesis verifications can be considerably reduced because it is not necessary to detect the correlation energy according to preambles.

In more detail, a method by which the preamble correlation energy detector 710 measures the correlation energy by using only the output signals of the decimator may be expressed by equation 1.

$$E_{PRMB}(k) = \left| \sum_{n=0}^{N-1} r(n-k) r^*(n-k+P) \right|^2 \quad \text{[Equation 1]}$$

In equation 1, the $E_{PRMB}$ (k) denotes a preamble correlation energy value measured in a $k^{th}$ sample. When the preamble is divided into three parts in time domain, the preamble itself has a periodic characteristic because the divided parts are equal to one another. If a period corresponding to this is P and one symbol constituting the preamble includes $N_{symb}$ samples, P is equal to $$P = \lfloor N_{symb}/3 \rfloor.$$

Herein, the N denotes the maximum number of samples used when the preamble correlation energy is measured, and a maximum accumulation interval used when equation 1 is calculated using the maximum accumulated number of inputted samples is $N_{symb}$–P. The preamble correlation energy value $E_{PRMB}$(k) is differently measured in each sample. In addition, measuring the preamble correlation energy by the sample does not represent that single sample energy is measured, but represents that the hypothesis verification is implemented by the sample. The correlation energy is calculated by accumulating correlation values for respective hypothesis verifications during sufficient intervals. Herein, as the accumulation interval becomes longer, result values have good properties. In the case of generating a separate preamble and calculating correlation values, the accumulation interval is not limited. However, when only using received signals, the accumulation interval is limited by a preamble interval. Herein, the maximum value of an available accumulation interval is set to N in equation 1. In equation 1, when generating the separate preamble and calculating correlation values, k has a meaning similar to synchronization error between received signals and the generated preamble.

The received signal strength detector 720 measures the strength of the decimator output signals. The signal strength is measured by a Received Signal Strength Indication (RSSI). Since the decimator output signals are outputted by the sample, the received signal strength detector 720 measures the strength of signals received in each sample. The timing controller 730 controls timing so that the received signal strength detector 720 can measure the strength of received signals in each sample, and may be included in the received signal strength detector 720.

In more detail, the received signal strength detector 720 measures the strength of received signals as expressed by equation 2.

$$E_{RSSI}(k) = \sum_{n=0}^{N-1} |r(n-k)|^2 \quad \text{[Equation 2]}$$

In equation 2, the $E_{RSSI}$ (k) denotes the received signal strength values measured in the $k^{th}$ sample, r(n) denotes the decimator output signals, and N denotes the number of $N_{symb}$ samples constituting one symbol.

The energy comparator/controller 740 compares the correlation energy values of the preambles outputted from the preamble correlation energy detector 710 with the received signal strength values outputted from the received signal strength detector 720, thereby controlling preamble correlation energy values. In detail, if the ratio of the preamble correlation energy with respect to the received signal strength is less than a certain value, the energy comparator/controller 740 sets the preamble correlation energy value to zero, thereby allowing a corresponding preamble correlation energy value to be excluded from the classification objects of the classifier 750.

Figure 8:
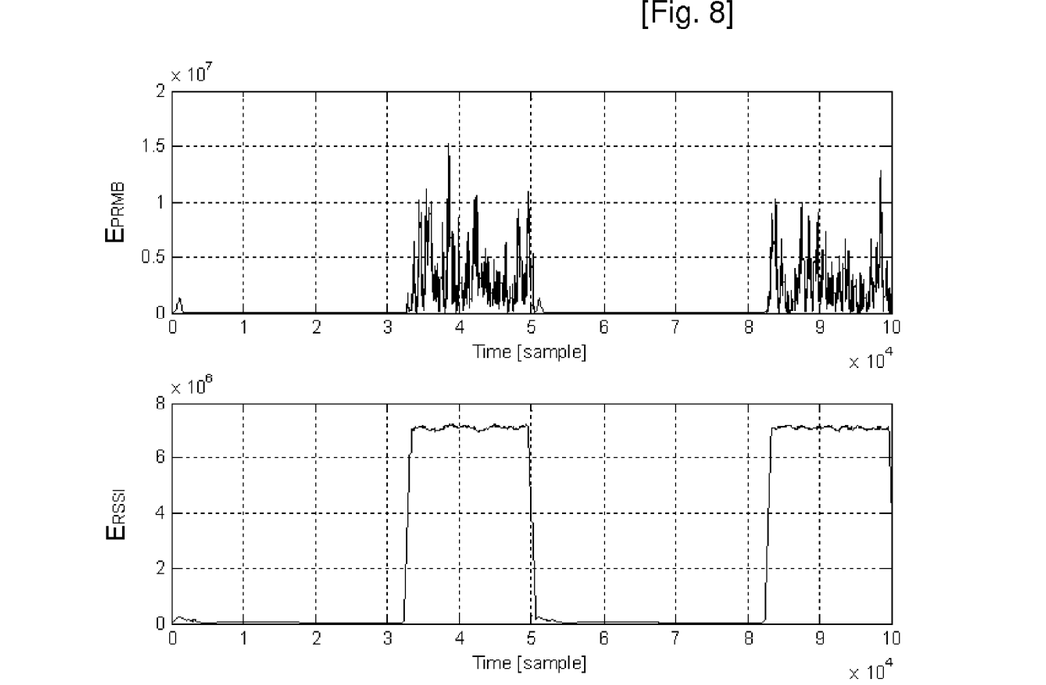
FIGS. 8 and 9 are simulation graphs of preamble correlation energy and received signal strength for describing the present invention.
Figure 9:
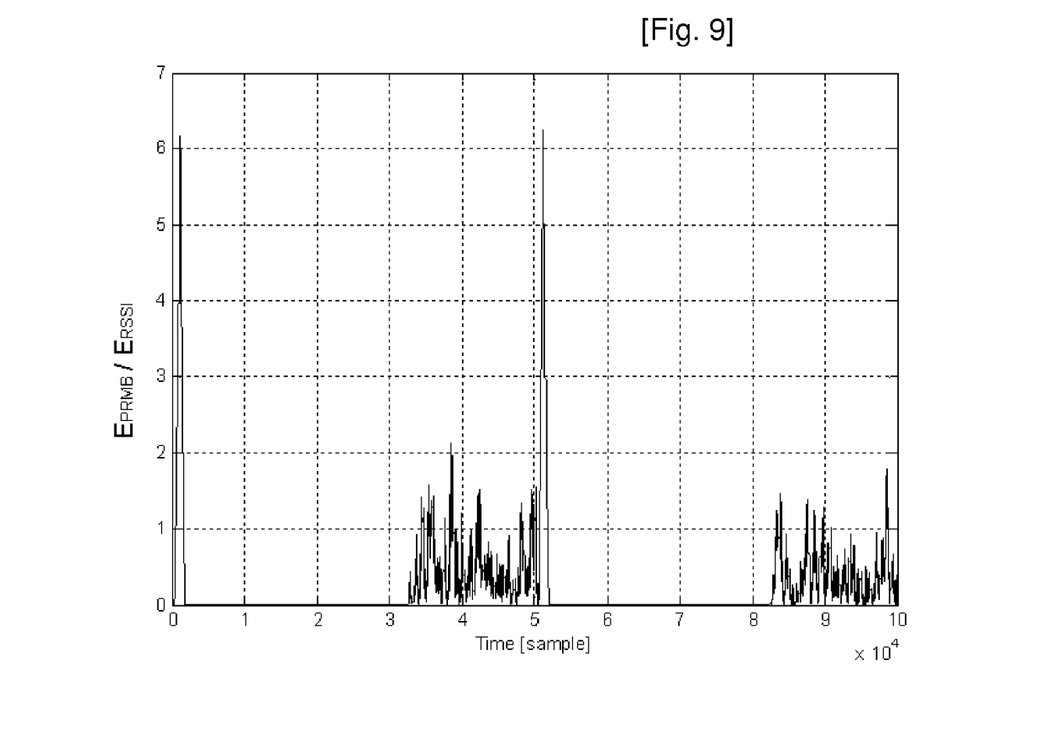

For example, when the uplink interference signals have power greater than that of the downlink signals as shown in FIG. 8, the preamble cannot be detected with the maximum value of the preamble correlation energy $E_{PRMB}$ because the preamble correlation energy $E_{PRMB}$ in the uplink is far greater than the preamble correlation energy $E_{PRMB}$ in the preamble. However, when considering the received signal strength $E_{RSSI}$, it is noted that the received signal strength $E_{RSSI}$ in the uplink is far greater than the received signal strength $E_{RSSI}$ in the preamble. Further, the ratio of the correlation energy $E_{PRMB}$ with respect to the received signal strength $E_{RSSI}$ is calculated, so that the preamble can be easily detected because the ratio in the preamble is greater than the ratio in the uplink as shown in FIG. 9. Accordingly, for the ratio of the correlation energy $E_{PRMB}$ with respect to the received signal strength $E_{RSSI}$, the preamble correlation energy value corresponding to a ratio of less than a certain reference is set to zero, so that it is excluded from the classifier 750 extracting the maximum value from the preamble correlation energy values.

The classifier 750 extracts the maximum value from the correlation energy values outputted from the energy comparator/controller 740. If the maximum value is greater than a certain threshold value, the classifier 750 regards that the preamble is located in a corresponding position, determines the position of the preamble as a frame boundary, and outputs results from the determination. That is, since the value of an uplink frame is excluded from the correlation energy values inputted to the classifier 750, a preamble having the highest energy is detected from the downlink frame.

The method by which the boundary detection apparatus having the construction as described above detects the boundary of a downlink frame according to the present invention may be divided into two stages. In the first stage, preamble correlation energy and received signal strength are measured for received signals by the sample, and a sample, in which the ratio of the preamble correlation energy with respect to the received signal strength is smaller than a reference value, is removed from frames constituting the received signals. In the second stage, a maximum value is extracted from preamble correlation energy values for all samples, and a sample corresponding to the maximum value is determined as the boundary of a downlink.

Hereinafter, this will be described in more detail with reference to FIG. 10.

First, the preamble correlation energy detector 710 and the received signal strength detector 720 respectively measure (S1003) preamble correlation energy values $E_{PRMB}$ and received signal strength values $E_{RSSI}$ from a sample (S1001) {sample number=0, and the sample number has a range from 0 to (the number of samples per frame−1)} initially inputted from the decimator.

Then, the energy comparator/controller 740 determines if the ratio of the $E_{PRMB}$ with respect to the $E_{RSSI}$ is greater than a threshold value $TH_{RATIO}$ (S1005). If the ratio of the $E_{PRMB}$ with respect to the $E_{RSSI}$ is smaller than the $TH_{RATIO}$, the energy comparator/controller 740 sets the $E_{PRMB}$ value to zero (S1007). Such a process is for determining if the preamble correlation energy with respect to the received signal strength is greater than a preset value, and for excluding the signals of an uplink frame. That is, when the ratio of the $E_{PRMB}$ with respect to the $E_{RSSI}$ is smaller than the $TH_{RATIO}$, the energy comparator/controller 740 sets the $E_{PRMB}$ value to zero because it is highly possible that a corresponding sample becomes the signal part of an uplink frame, and then excludes the sample when the classifier 750 extracts the maximum value of the $E_{PRMB}$. The $TH_{RATIO}$ is a minimum threshold value for removing the signals of an uplink frame by the energy comparator/controller 740 in FIG. 7 as described above. That is, if interference signals having energy greater than that of a preamble exist in the uplink frame, the ratio of the $E_{PRMB}$ and the $E_{RSSI}$ corresponding to such interference signals is found in advance through an experiment, etc., and then the $TH_{RATIO}$ is determined.

In the meantime, the timing controller 730 checks each sample number (S1009), and determines if the preamble correlation energy values $E_{PRMB}$ and the received signal strength values $E_{RSSI}$ have been respectively measured for samples within one frame. Otherwise, the timing controller 730 increases the sample number, and allows the preamble correlation energy detector 710 and the received signal strength detector 720 to consecutively measure the preamble correlation energy values $E_{PRMB}$ and the received signal strength values $E_{RSSI}$, respectively (S1011).

After the preamble correlation energy values $E_{PRMB}$ are measured for samples, the classifier 750 extracts a maximum value from the $E_{PRMB}$ values for the samples (S1013). The maximum value of the $E_{PRMB}$ extracted in this way is compared with a PRMB threshold value $TH_{SYNC}$ for determining the success or failure of the boundary detection SYNC of a downlink frame (S1015). If the maximum value of the $E_{PRMB}$ is greater than the threshold value $TH_{SYNC}$, the classifier 750 determines that the boundary detection of the SYNC downlink frame has been succeeded (S1017). Otherwise, the classifier 750 determines that the boundary detection of the downlink frame has failed, and allows the boundary of the downlink frame to be repeatedly detected starting from step S1001 (S1019).

Figure 10:
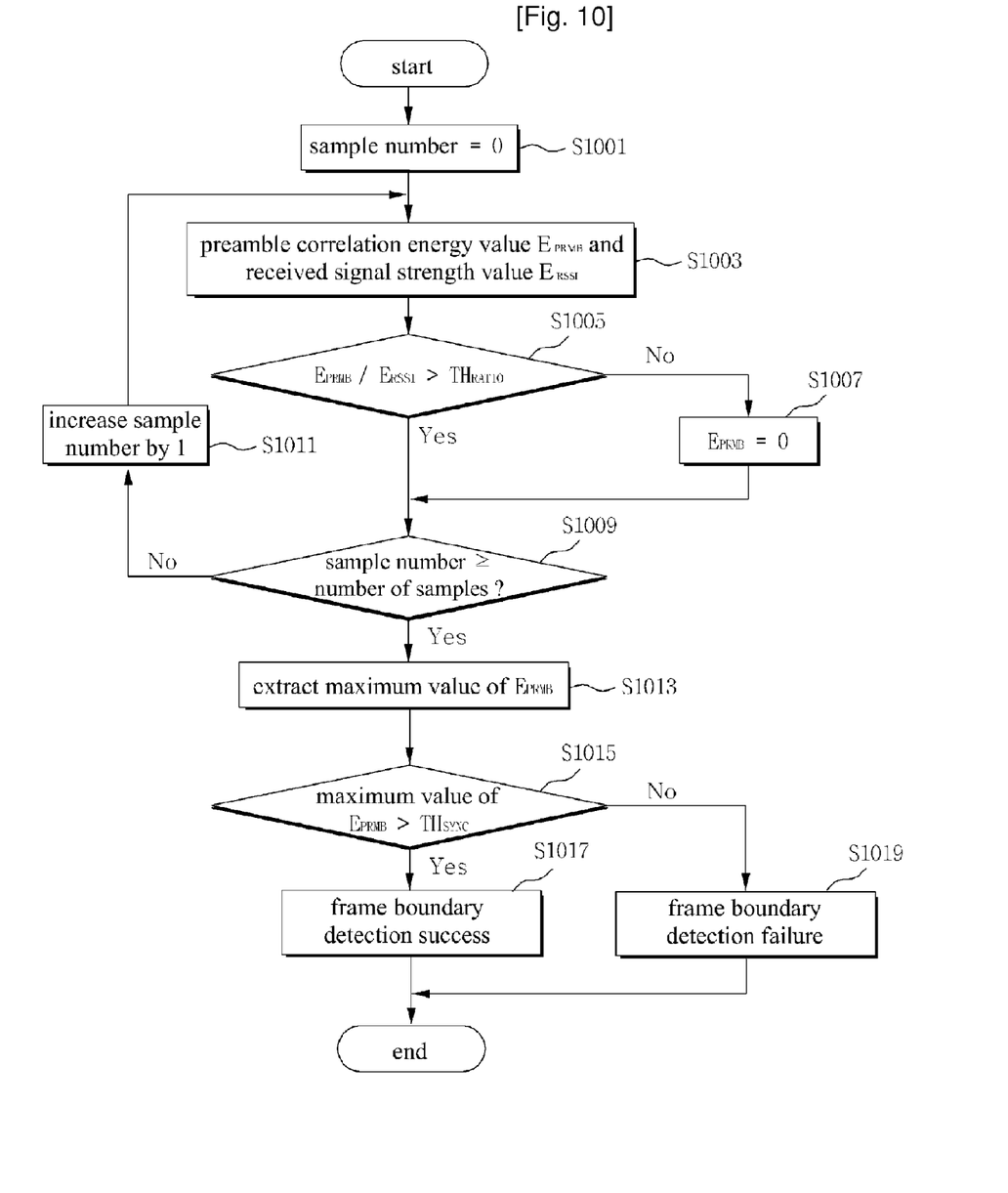
FIG. 10 is a flow diagram showing a method for detecting the boundary of a downlink frame according to a first embodiment of the present invention.

The boundary detection method of the downlink frame according to the first embodiment of the present invention additionally adds an exclusion condition (step S1105 in FIG. 11) of an uplink frame to steps S1001, S1003, S1005, S1007, S1009 and S1011 in FIG. 10 in which the preamble correlation energy values and the received signal strength are measured and a part for the uplink frame is excluded, so that it is possible to improve the reliability of the boundary detection of the downlink frame.

Figure 11:
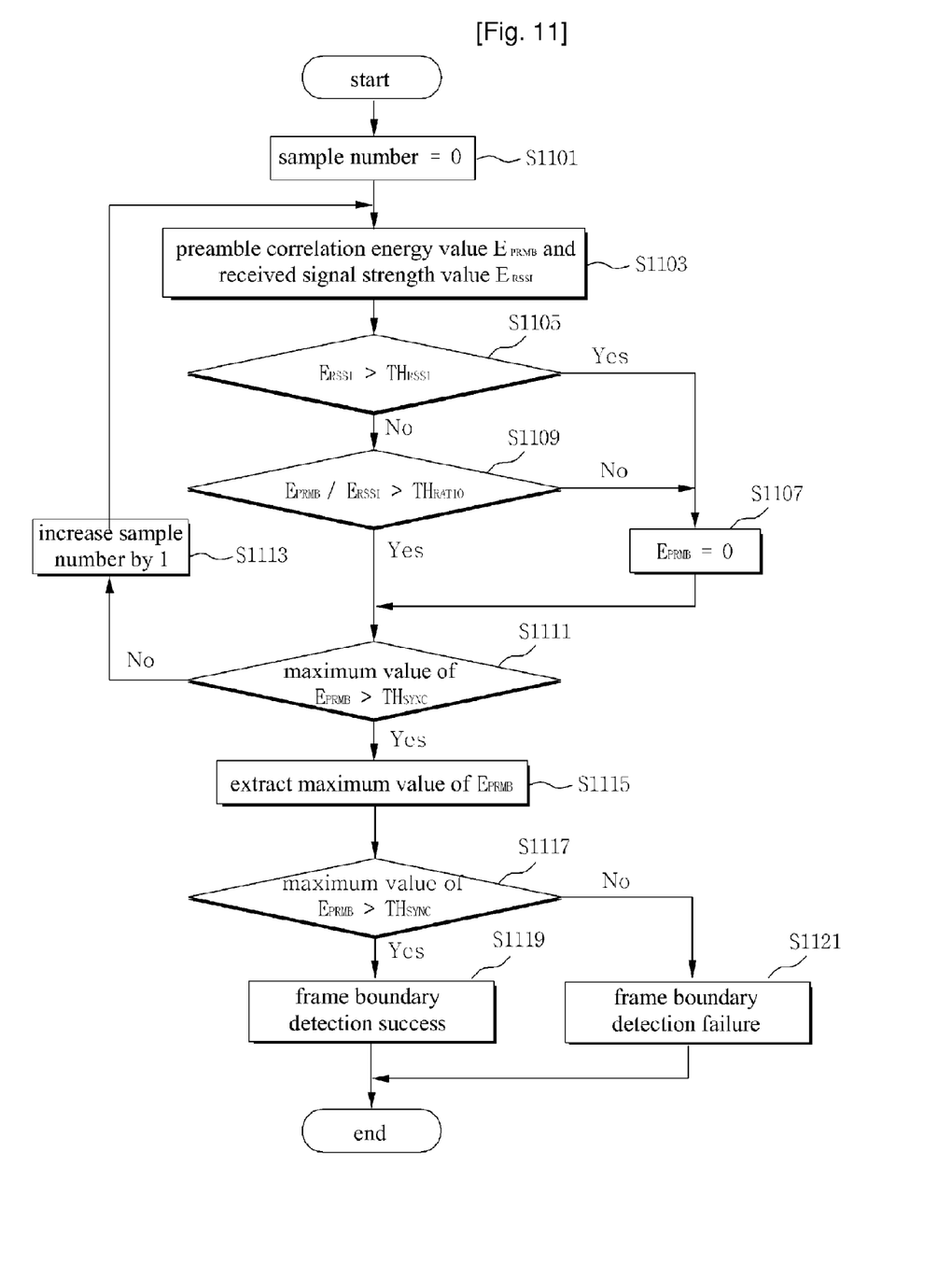
FIG. 11 is a flow diagram showing a modified method for detecting the boundary of a downlink frame according to a first embodiment of the present invention.

As shown in FIG. 11, the preamble correlation energy detector 710 and the received signal strength detector 720 respectively measure preamble correlation energy values $E_{PRMB}$ and received signal strength values $E_{RSSI}$ (S1101 and S1103), and then the energy comparator/controller 740 determines if the $E_{RSSI}$ is greater than a $TH_{RSSI}$ (S1105). If the $E_{RSSI}$ is greater than the $TH_{RSSI}$, the energy comparator/controller 740 sets the $E_{PRMB}$ value to zero (S1107). Through such a process, if the received signal strength for a specific sample has a value of more than a certain level, the energy comparator/controller 740 determines that a certain sample corresponds to the signal part of an uplink frame, and sets the $E_{PRMB}$ value to zero, so that the sample is excluded when the classifier 750 extracts the maximum value of the $E_{PRMB}$. It is preferred that the $TH_{RSSI}$ is set to have a value obtained by dividing the maximum value of the $E_{RSSI}$, which is measurable in the apparatus, by 2. Herein, the measurable maximum value is not a maximum value measured only in received signals, the strength of which is being currently measured.

Then, the energy comparator/controller 740 determines the ratio of the $E_{PRMB}$ with respect to the $E_{RSSI}$ is greater than the $TH_{RATIO}$ (S1109). If the ratio of the $E_{PRMB}$ with respect to the $E_{RSSI}$ is smaller than the $TH_{RATIO}$, the energy comparator/controller 740 sets the $E_{PRMB}$ value to zero (S1107).

In the meantime, the timing controller 730 checks each sample number (S1111), and determines if the preamble correlation energy values $E_{PRMB}$ and the received signal PRMB strength values $E_{RSSI}$ have been respectively measured for all samples within one frame. Otherwise, the timing controller 730 increases the sample number, and allows the preamble correlation energy detector 710 and the received signal strength detector 720 to consecutively measure the preamble correlation energy values $E_{PRMB}$ and the received signal strength values $E_{RSSI}$, respectively (S1113).

After the preamble correlation energy values $E_{PRMB}$ are measured for all the samples, the classifier 750 extracts a maximum value from the $E_{PRMB}$ values for all the samples (S1115). The maximum value of the $E_{PRMB}$ extracted in this way is compared with a threshold value $TH_{SYNC}$ for determining the success or failure of the boundary detection of a downlink frame (S1117). If the maximum value of the $E_{PRMB}$ is greater PRMB than the threshold value $TH_{SYNC}$, the classifier 750 determines that the boundary detection of the downlink frame has been succeeded (S1119). Otherwise, the classifier 750 determines that the boundary detection of the downlink frame has failed, and allows the boundary of the downlink frame to be repeatedly detected starting from step S1101 (S1121).

Figure 12:
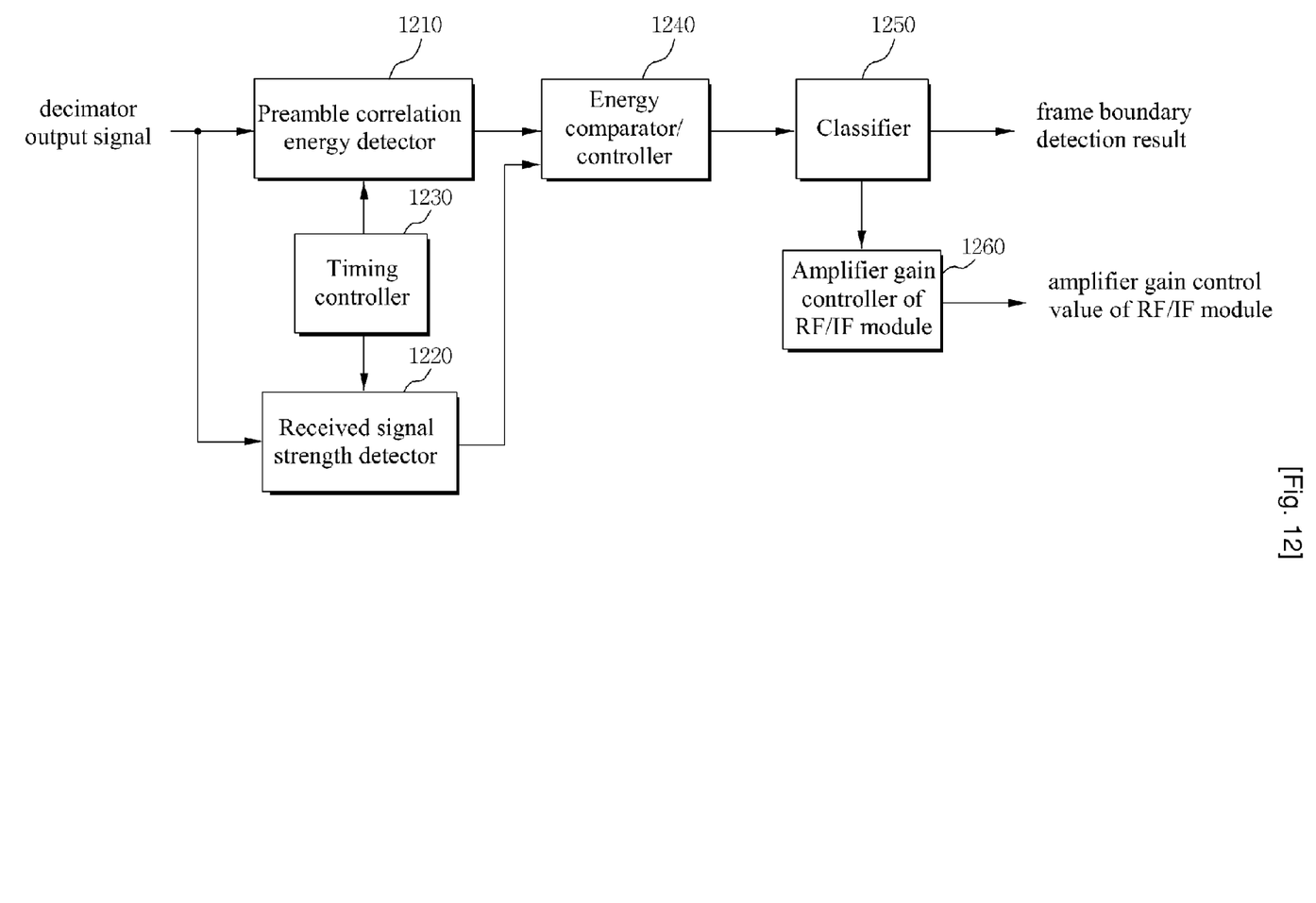
FIG. 12 is a block diagram showing the detailed construction of an apparatus detecting the boundary of a downlink frame according to a second embodiment of the present invention.

In the meantime, the boundary detection apparatus of the downlink frame as shown in FIG. 7 uses the signals processed by the RF/IF module 620 in FIG. 6 located in the prior stage. Therefore, it may fail to detect the boundary of the downlink frame depending on the gain of a Gain Control Amplifier (hereinafter, referred to as GCA) in the RF/IF module. That is, if the variation of signals is too large or small, signals inputted to the boundary detection apparatus of the downlink frame according to the present invention deviate from the condition in which the signal part of the uplink frame is excluded as described above, so that it may become difficult to actually detect the boundary of the downlink frame. On account of this, the present invention is characterized in that it can further include an amplifier gain controller 1260 of the RF/IF module so that it is possible to control the gain of the GCA of the RF/IF module when failing to detect the boundary of the downlink frame, as shown in FIG. 12.

The boundary detection apparatus of the downlink frame according to a second embodiment of the present invention includes a preamble correlation energy detector 1210, a received signal strength detector 1220, a timing controller 1230, an energy comparator/controller 1240, a classifier 1250, and the amplifier gain controller 1260 of the RF/IF module.

The preamble correlation energy detector 1210 generates the preambles pre-determined by a system for use, calculates correlation values with inputted decimator output signals, and then measures correlation energy values from the calculated correlation values. Herein, the timing controller 1230 adjusts the phases of the preambles generated by the preamble correlation energy detector 1210. Since the signals are received from the decimator in the unit of sample, the preamble correlation energy detector 1210 measures the correlation values and correlation energy values for all the generated preambles in each sample. The controller 1230 may be included in the preamble correlation energy detector 1210.

Further, the preamble correlation energy detector 1210 may directly generate and use the preambles, predetermined by the system for use, through the control of the timing controller 1230 if the situation requires. In addition, the preamble correlation energy detector 1210 may also store in advance the predetermined preambles in a storage unit such as a ROM, and sequentially read and use the preambles. Furthermore, the preamble correlation energy detector 1210 can measure correlation energy as expressed by equation 1.

The received signal strength detector 1220 measures the strength of the decimator output signals. The signal strength is measured by a RSSI. Since the decimator output signals are outputted by the sample, the received signal strength detector 1220 measures the strength of signals received in each sample. The timing controller 1230 controls timing so that the received signal strength detector 1220 can measure the strength of received signals in each sample, and may be included in the received signal strength detector 1220. Further, the received signal strength detector 1220 can measure received signal strength as expressed by equation 2.

The energy comparator/controller 1240 compares the correlation energy values of the preambles outputted from the preamble correlation energy detector 1210 with the received signal strength values outputted from the received signal strength detector 1220, thereby controlling preamble correlation energy values. In detail, if the ratio of the preamble correlation energy with respect to the received signal strength is less than a certain value, the energy comparator/controller 1240 sets the preamble correlation energy value to zero, thereby allowing a corresponding preamble correlation energy value to be excluded from the classification objects of the classifier 1250.

The classifier 1250 extracts the maximum value from the correlation energy values outputted from the energy comparator/controller 1240. If the maximum value is greater than a certain threshold value, the classifier 750 regards that the preamble is located in a corresponding position, determines the position of the preamble as a frame boundary, and outputs results from the determination. That is, since a sample, in which the ratio of the correlation energy with respect to the strength of the received signals is smaller than a reference value, is excluded from the correlation energy values inputted to the classifier 1250, a preamble having the highest energy is detected from the downlink frame.

If information about the boundary detection failure of the downlink frame is received from the classifier 1250, the amplifier gain controller 1260 controls the gain of the GCA of the RF/IF module to increase by a certain size. Herein, if the increased gain value of the GCA is greater than a maximum reference threshold value, the amplifier gain controller 1260 controls the gain of the GCA of the RF/IF module to be initialized.

Figure 13:
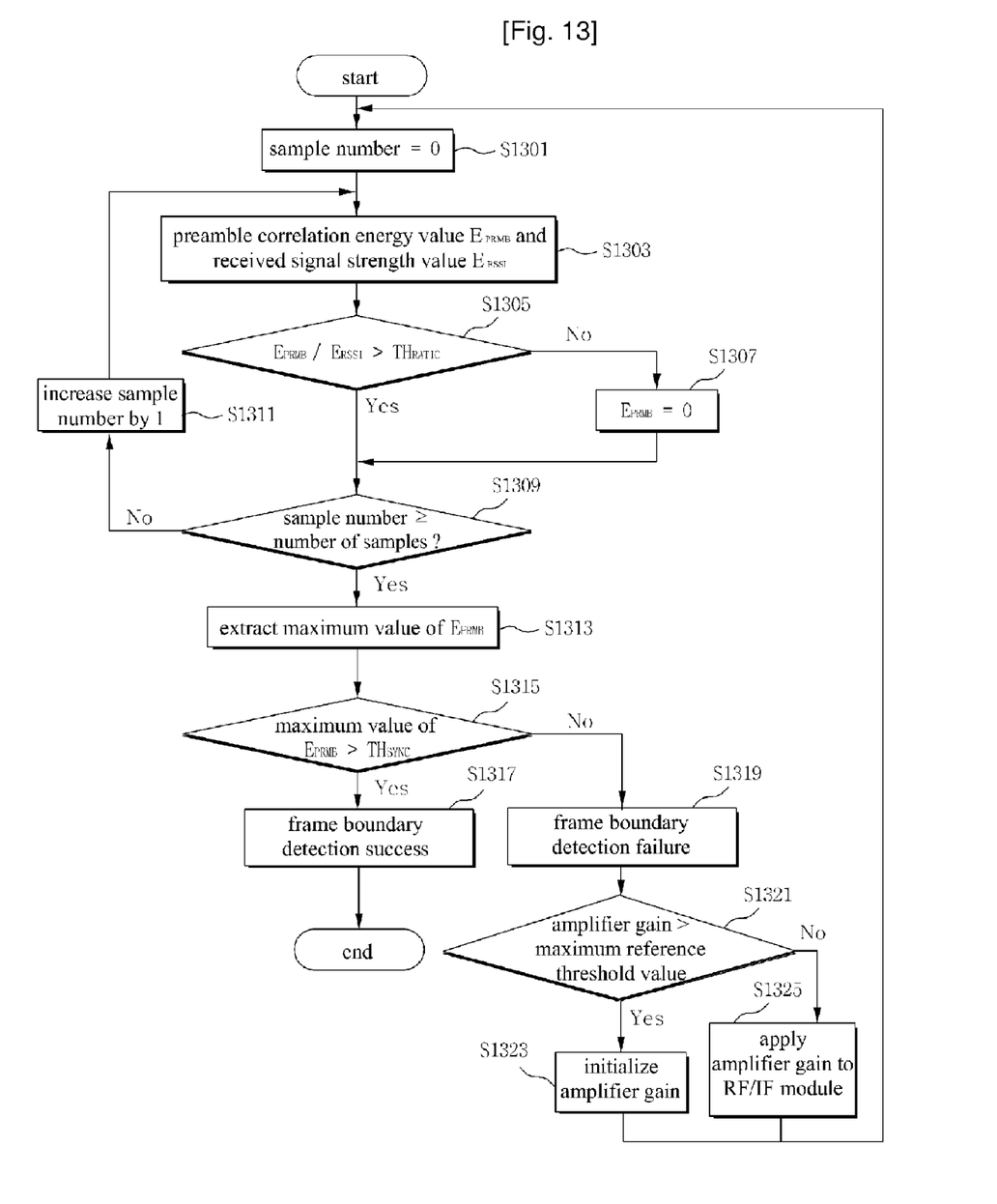
FIG. 13 is a flow diagram showing a method for detecting the boundary of a downlink frame according to a second embodiment of the present invention.

Hereinafter, the method by which the boundary detection apparatus detects the boundary of the downlink frame according to the second embodiment of the present invention will be described. The boundary detection method of the downlink frame may be divided into three stages. In the first stage, preamble correlation energy and received signal strength are measured and a sample, in which the ratio of the correlation energy with respect to the received signal strength is smaller than a reference value, is excluded. In the second stage, a maximum value is extracted from preamble correlation energy values for all samples, is compared with a specific threshold value, and whether the boundary detection operation of the downlink frame has been completed is determined. In the third stage, the gain of the GCA of the RF/IF module is controlled when failing to detect the boundary of the downlink frame.

Hereinafter, this will be described in more detail with reference to FIG. 13.

First, the preamble correlation energy detector 1210 and the received signal strength detector 1220 respectively measure (S1301) preamble correlation energy values $E_{PRMB}$ and received signal strength values $E_{RSSI}$ from a sample (S1303) {sample number=0, and the sample number has a range from 0 to (the number of samples per frame−1)} initially inputted from the decimator.

Then, the energy comparator/controller 1240 determines if the ratio of the $E_{PRMB}$ with respect to the $E_{RSSI}$ is greater than a threshold value $TH_{RATIO}$ (S1305). If the ratio of the $E_{PRMB}$ with respect to the $E_{RSSI}$ is smaller than the $TH_{RATIO}$, the energy comparator/controller 1240 sets the $E_{PRMB}$ value to zero (S1307). The $TH_{RATIO}$ is a minimum threshold value for removing the sample, in which the ratio of the correlation energy with respect to the received signal strength is smaller than the reference value, by the energy comparator/controller 1240 in FIG. 12 as described above. That is, if interference signals having energy greater than that of a preamble exist in the uplink frame, the ratio of the $E_{PRMB}$ with respect to the $E_{RSSI}$ corresponding to such interference signals is found in advance through an experiment, etc., and then the $TH_{RATIO}$ is determined.

In the meantime, the timing controller 1230 checks each sample number (S1309), and determines if the preamble correlation energy values $E_{PRMB}$ and the received signal strength values $E_{RSSI}$ have been respectively measured for all samples. Otherwise, the timing controller 1230 increases the sample number, and allows the preamble correlation energy detector 1210 and the received signal strength detector 1220 to consecutively measure the preamble correlation energy values $E_{PRMB}$ and the received signal strength values $E_{RSSI}$, respectively (S1311).

After the preamble correlation energy values $E_{PRMB}$ are measured for all the PRMB samples, the classifier 1250 extracts a maximum value from the $E_{PRMB}$ values for all the PRMB samples (S1313). The maximum value of the $E_{PRMB}$ extracted in this way is compared with a threshold value $TH_{SYNC}$ for determining the success or failure of the boundary SYNC detection of a downlink frame (S1315). If the maximum value of the $E_{PRMB}$ is greater PRMB than the threshold value $TH_{SYNC}$, the classifier 1250 determines that the boundary SYNC detection of the downlink frame has been succeeded (S1317).

However, if the maximum value of the $E_{PRMB}$ is smaller than the threshold value $TH_{SYNC}$, the classifier 1250 determines that the boundary detection of the downlink frame has failed, and sends corresponding information to the amplifier gain controller 1260. Then, the amplifier gain controller 1260 increases a gain value set in the GCA of the RF/IF module by a certain size (S1319), and determines if the increased gain value is greater than the maximum reference threshold value of the gain (S1321). If the increased gain value is smaller than the maximum reference threshold value, the amplifier gain controller 1260 provides the gain value increased in step 1319 for application to the RF/IF module (S1325). However, if the increased gain value is greater than the maximum reference threshold value, the amplifier gain controller 1260 controls the gain of the GCA of the RF/IF module to be initialized (S1323).

Accordingly, after the gain of the GCA of the RF/IF module is altered through such processes, if the signals processed in the RF/IF module are inputted to the boundary detection apparatus of the downlink frame according to the second embodiment of the present invention via the ADC, the baseband filter and the decimator by the altered gain (refer to FIG. 2), all the processes are repeated to detect the boundary of the downlink frame.

In the meantime, step S1105 of FIG. 11 may be further included and performed between steps S1303 and S1305 in FIG. 13.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. An apparatus for detecting a boundary of a frame in a wireless communication system, the apparatus comprising:
    a controller for measuring correlation energy with preambles with respect to received signals, measuring strength of the received signals, and removing a sample from frames of the received signals, the preambles predetermined and used by the system, the sample having a ratio of the correlation energy with respect to the strength of the received signals, the ratio being smaller than a reference value; and
    a classifier for extracting a maximum value from the correlation energy received from the controller, and determining the boundary of a downlink from the frames of the received signals.

2. The apparatus as claimed in claim 1, further comprising an amplifier gain controller for controlling a gain of the received signals in the case that the classifier has failed to determine the boundary of the downlink.

3. The apparatus as claimed in claim 1, wherein the controller comprises:
    a preamble correlation energy detector for calculating correlation values with the preambles in each sample of the received signals, and measuring correlation energy from the calculated correlation values;
    a received signal strength detector for measuring the strength of the received signals in each of the samples; and
    an energy comparator/controller for comparing the correlation energy received from the preamble correlation energy detector with the strength of the received signals received from the received signal strength detector, and removing the sample in which the ratio of the correlation energy with respect to the strength of the received signals is smaller than the reference value.

4. The apparatus as claimed in claim 3, wherein, if a value obtained by dividing the correlation energy by the strength of the received signals is smaller than a preset value, the energy comparator/controller sets the correlation energy of a corresponding sample to have a value of 0, and removes the sample, in which the ratio of the correlation energy with respect to the strength of the received signals is smaller than the reference value, from the frames of the received signals.

5. The apparatus as claimed in claim 1, wherein the controller further comprises a timing controller for sequentially increasing each sample number, and allowing the preamble correlation energy and the strength of the received signals to be measured for said each of the samples.

6. An apparatus for detecting a boundary of a frame in a wireless communication system, the apparatus comprising:
    a preamble correlation energy detector for detecting correlation energy of one or more samples of decimator output signals and at least one predetermined preamble;
    a received signal strength detector for measuring the strength of the decimator output signals in each of the samples;
    an energy comparator/controller for comparing the correlation energy received from the preamble correlation energy detector with the strength of the received signals received from the received signal strength detector, and removing a sample in which the ratio of the correlation energy with respect to the strength of the received signals is smaller than a reference value; and
    a classifier for extracting a maximum value from the correlation energy received from the energy comparator/controller, and determining the boundary of a downlink from the frames of the received signals.

7. The apparatus as claimed in claim 6, further comprising a timing controller for controlling phase and time of the preamble so that the preamble correlation energy detector and the received signal strength detector to respectively measure the correlation energy of the preamble and the strength of the received signals in each sample of the received signals.

8. The apparatus as claimed in claim 6, further comprising an amplifier gain controller for controlling a gain of an amplifier included in an RF/IF module when the classifier has failed to determine the boundary of the downlink.

9. The apparatus as claimed in claim 8, wherein the amplifier gain controller controls the gain by increasing the preset gain of the amplifier by a certain size.

10. The apparatus as claimed in claim 9, wherein, if the increased gain is greater than a maximum reference threshold value of the gain, the amplifier gain controller initializes the gain.

11. The apparatus as claimed in claim 8, wherein, if a maximum value of the correlation energy is greater than a certain threshold value, the classifier determines a sample corresponding to the maximum value of the correlation energy as the boundary of the frame.

12. The apparatus as claimed in claim 8, wherein the preamble correlation energy detector generates a preamble in calculation of the correlation value, and calculates the correlation value, the preamble being predetermined and used by the system.

13. The apparatus as claimed in claim 8, wherein, if the strength of the received signals has a large value of more than a certain level, the energy comparator/controller sets a correlation energy value of the preamble of a corresponding sample to zero, and removes the sample, in which the ratio of the correlation energy with respect to the strength of the received signals is smaller than the reference value, from the frames of the received signals.

14. The apparatus as claimed in claim 13, wherein, in the case that the strength of the received signals has a value greater than a maximum value/2 of the received signals, the energy comparator/controller sets the correlation energy value of the preamble of the corresponding sample to zero.

15. The apparatus as claimed in claim 8, wherein, if the ratio of the correlation energy with respect to the strength of the received signals is smaller than a preset value, the energy comparator/controller sets a correlation energy value of the preamble of a corresponding sample to zero, and removes the sample, in which the ratio of the correlation energy with respect to the strength of the received signals is smaller than the reference value, from the frames of the received signals.

16. The apparatus as claimed in claim 8, wherein the preamble correlation energy detector reads a preamble predetermined and used by the system from a separate storage means, and uses the preamble in calculation of the correlation value.

17. A method for detecting a boundary of a frame in a wireless communication system, the method comprising the steps of:
- a) measuring correlation energy of sample signals transmitted from a transmitter and preambles predetermined and used by the system, and measuring strength of the sample signals transmitted from the transmitter;
- b) removing a sample in which a ratio of the correlation energy with respect to the strength of the received signals is smaller than a reference value; and
- c) extracting a maximum value from the correlation energy in which the sample has been removed, and determining the boundary of a downlink from the frames of the received signals.

18. The method as claimed in claim 17, further comprising step d) of, when it has failed to determine the boundary of the downlink in step c), controlling a gain of the received signals by increasing a gain of an amplifier by a certain size.

19. The method as claimed in claim 17, wherein, if the strength of the received signals has a large value of more than a certain level in step b), a correlation energy value of the preamble of a corresponding sample is set to zero, and the sample, in which the ratio of the correlation energy with respect to the strength of the received signals is smaller than the reference value, is removed from the frames of the received signals.

20. The method as claimed in claim 19, wherein, when the strength of the received signals has a value greater than a maximum value/2 of the received signals, the correlation energy value of the preamble of the corresponding sample is set to zero.

21. The method as claimed in claim 17, wherein, if the ratio of the correlation energy with respect to the strength of the received signals is smaller than a preset value in step b), a correlation energy value of the preamble of a corresponding sample is set to zero, and the sample, in which the ratio of the correlation energy with respect to the strength of the received signals is smaller than the reference value, is removed from the frames of the received signals.

\* \* \* \* \*